(12) United States Patent
Seibert

(10) Patent No.: US 6,601,107 B1
(45) Date of Patent: Jul. 29, 2003

(54) ADAPTIVE FUZZY CONTROL OF DATA ACQUISITION AND BROADCASTING

(75) Inventor: Kenneth D. Seibert, Redondo Beach, CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/016,901

(22) Filed: Feb. 2, 1998

(51) Int. Cl.$^7$ .................. G06F 15/173; H04N 7/173
(52) U.S. Cl. .......................... 709/240; 725/95
(58) Field of Search .................. 709/103, 104, 709/235, 238, 240, 241, 232; 725/14, 24, 95, 96, 97

(56) References Cited

U.S. PATENT DOCUMENTS

| | | | | |
|---|---|---|---|---|
| 4,805,107 A | * | 2/1989 | Kieckhafer et al. | 364/200 |
| 5,759,101 A | * | 6/1998 | Von Kohorn | 463/40 |
| 5,822,301 A | * | 10/1998 | Arnold et al. | 370/238 |
| 6,078,946 A | * | 6/2000 | Johnson | 709/200 |
| 6,088,722 A | * | 7/2000 | Herz et al. | 709/217 |
| 6,098,065 A | * | 8/2000 | Skillen et al. | 707/3 |
| 6,144,944 A | * | 11/2000 | Kurtzman, II et al. | 705/14 |
| 6,252,544 B1 | * | 6/2001 | Hoffberg | 342/357.1 |

OTHER PUBLICATIONS

Text Retrieval Software for Microcomputers and Beyond: An overview and a Review of Four Packages; Lundeen et al.; Database; Weston; Aug. 1992.*
Blazing New Mail Trails: Watson. Sharon; Computerworld; Framingham; Jan. 1998.*
Route the Board, HAL: Blanchard, David; Printed Circuit Design; San Francisco; Jun. 1996.*
Fuzzy Logic: What it is; What it does; What it can do; Anderson, Glenn; Cincinnati; Oct. 1994.*

* cited by examiner

*Primary Examiner*—Glenton B. Burgess
*Assistant Examiner*—Tod Kupstas
(74) *Attorney, Agent, or Firm*—John A. Crook; Michael W. Sales

(57) ABSTRACT

Efficient assembly and transmission of information to multiple receivers and efficient acquisition of information from multiple sources over a shared communication channel is provided. An adaptive fuzzy control system prioritizes files for broadcast delivery or acquisition. Files are assigned a degree of membership in fuzzy variables and mapped onto a multi-dimensional control surface to determine which files should be sent or acquired first. Each of the fuzzy variables is divided into sets wherein a particular file can be a member of more than one set at varying degrees. The control surface is periodically reshaped to adapt in a dynamic environment, thereby converging on the optimal solution for the current conditions.

9 Claims, 6 Drawing Sheets

ADAPTIVE FUZZY CONTROL OF DATA ACQUISITION AND BROADCASTING

TECHNICAL FIELD OF THE INVENTION

The present invention relates in general to information transmission and acquisition and in particular to efficient methods of assembling, transmitting, and/or acquiring data to and from multiple network locations.

BACKGROUND OF THE INVENTION

Many communication systems rely on a common channel, such as a band of frequencies or a computer network, to be shared among multiple users, in order to provide one-to-one and one-to-many information conduits. A problem with such systems is how to trade off the urgency of a particular transmission with the need to politely share the limited communication channel.

For example, web pages are frequently used to deliver information over the Internet and one method of insuring delivery of the most recent edition of a page of information is to transmit it only when it is requested. This 'client pull' methodology, commonly employed in browser software, is accomplished by entering a page's address or through a hyper-text link. However, if several users request the same page of information, as is often the case, multiple copies are transmitted over the same medium, placing undue burden on the limited bandwidth of the system.

By using a broadcast paradigm the information can be sent once and stored locally by each client wishing to view the content at some later time. However, using this 'server push' methodology, if the need for the information is unknown prior to broadcast or the client is not connected and listening to the network at the appropriate time, the transmission is missed. At that point an individual copy of the information would need to be requested creating additional burden on the transmission system, or the broadcast would need to be resent periodically.

Simply repeating the transmission periodically is insufficient. With large amounts of information being served and bandwidth being limited, long periods of time could elapse between updates. Users who missed the last broadcast might have to wait hours to get updated, and further, the utility of information that is changing rapidly, such as stock quotes or traffic conditions, could expire prior to delivery. For example, say a news story changes on average every three days, but has a wide variance, perhaps changing three days in a row and then not for a week. A simple system would fail to transmit new information in a timely manner if the frequency was set to low (e.g., once a week), it would waste bandwidth by transmitting old information to often if the frequency was set to high (e.g., once a day), and it would do both if the frequency was set to the average of once every three days.

An analogous situation, but in reverse, exists when a server or client attempts to acquire information from a plurality (potentially millions) of sources (other servers). Polling the sources for new information too often wastes bandwidth. Not polling often enough fails to acquire information in a timely manner.

What is needed therefore, is a method of transmitting data to a plurality of varying receivers that insures the timely delivery of varying information with optimal use of available bandwidth, and/or a corresponding method to acquire desired information for broadcast.

SUMMARY OF THE INVENTION

The present invention relates to efficient assembly and/or transmission of information to multiple receivers and efficient acquisition of information from multiple sources over a shared communication channel. The present invention describes a method for determining the order and frequency in which to broadcast or acquire files which overcomes the existing problems associated with inefficient bandwidth or other resource allocation, excessive delays, and lost information.

In accordance with the preferred embodiment of the present invention, an adaptive fuzzy control system is employed to prioritize files used to compose pages of information for broadcast delivery or acquisition over a communication medium. This is accomplished by assigning all of the files a degree of membership in each of three fuzzy variables, namely, file age, transmission age, and urgency (expiration time). It should be understood, however, that any fuzzy variables deemed important to the prioritization of the files could also be used. Such variables might include feedback or other communication from the clients. By way of example only, the number of clients requiring a file, the frequency each client intends or actually does view a page, or the user's satisfaction level may be used.

Each of the fuzzy variables is divided into sets. For example, the file age might be described in four sets, new, recent, stale, and old. The assignment is on a fuzzy logic scale, wherein a particular file can be a member of more than one set of an input variable, at varying degrees. For example, a file may be 80% new and 20% recent. The degree of membership is determined by the centroids of the input variables.

The files are then mapped on to a multi-dimensional control surface (4 dimensions with 3 input variables), through a set of rules, to determine which files should be sent or acquired first. For example, a rule might be, "if a file is recent, then give it a medium-high priority." The relative importance of these rules is determined by a set of weights. The centroids and weights are continually adjusted during operation to optimize the efficiency of the system in a dynamic environment. Adjusting the centroids and weights has the effect of reshaping the multi-dimensional control surface. Periodically the files are scheduled for transmission and/or acquisition by locating the priority on the current multi-dimensional control surface.

The method of the present invention provides efficient scheduling for file transfers in a broadcast system using modest computational resources. Further, the present invention learns how to improve the results it achieves in a changing environment, continually converging on the optimal solution for the current conditions.

BRIEF DESCRIPTION OF THE DRAWINGS

These and other features and advantages of the present invention will become more apparent from a detailed consideration of the invention when taken in conjunction with the drawings in which.

DETAILED DESCRIPTION

By the way of example only, the method and apparatus of the present invention is used to determine the order and frequency in which to broadcast files from a server to a plurality of clients or acquire files from a plurality of servers over the Internet or an intranet. It should be understood, however, that any communication system requiring efficient transmission scheduling may alternatively employ the techniques shown herein. Such systems might include other broadcast communications techniques not traditionally associated with the Internet or an intranet. For example, paging or cellular systems delivering news or other periodic information could benefit from the method of the present invention. Also, direct to home (DTH) satellite communications, or other local or wide area wired or wireless audio/video/data communication systems could utilize the present invention. Generally, the techniques of the present invention are best used by client/server messaging systems with varying delivery requirements of dynamic data, that can benefit from a reduction in latency and missed messages.

Generally, one embodiment of the present invention employs an adaptive fuzzy control system to prioritize files used to compose pages of information for delivery (e.g., over the Internet) by assigning each of the files a degree of membership in various fuzzy input variables. The assignment is on a fuzzy logic scale, wherein a particular file can be a member of more than one set of an input variable, at varying degrees. The files are then mapped on to a multi-dimensional control surface, through a set of rules, according to the method of the present invention, to determine which files should be sent or acquired first. The resulting transmission order of the files minimizes latency and data loss while continuously self optimizing its efficient use of available bandwidth.

Figure 1:
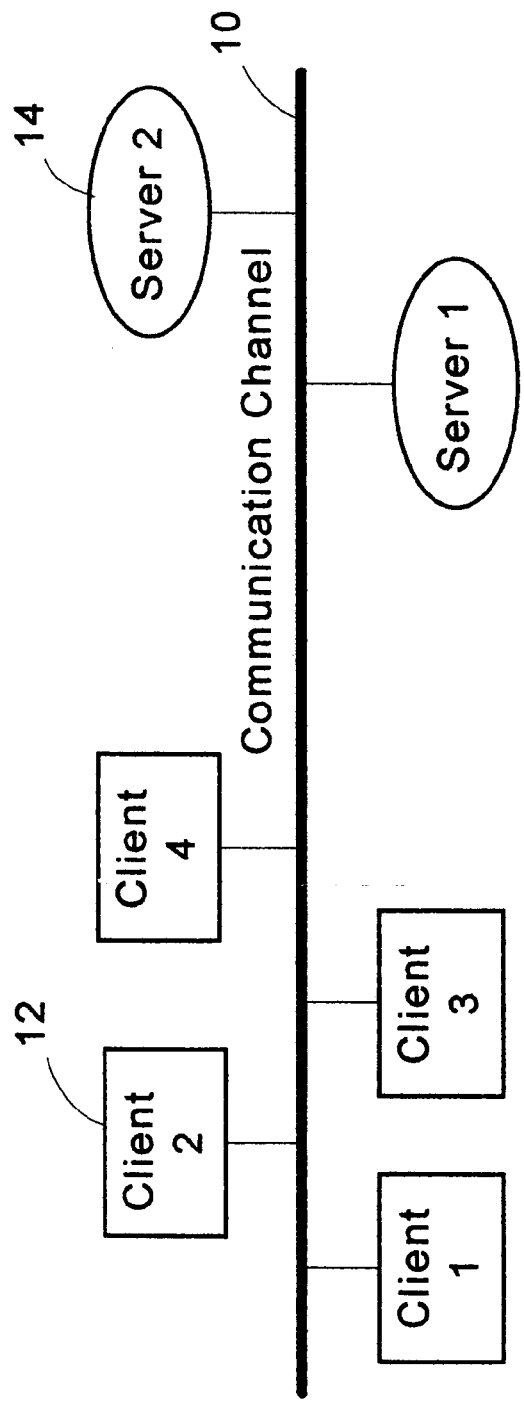
FIG. 1 is a diagram of a typical computer network which relies on a shared communication channel in order to provide one-to-one and one-to-many information conduits and is capable of utilizing the present invention.

Turning now to the figures, FIG. 1 illustrates a typical computer network capable of utilizing the present invention. A communication channel 10 is shared by a plurality of clients 12 and servers 14. A client 12 is a consumer of information; and a server 14 is a provider of information. Although a client could take on many forms, such as a telephone, pager, kiosk, teller machine, reservation system, etc., the typical case for the Internet or other data distribution system is a personal computer. Communication occurs in nearly all conceivable combinations, such as client 12 to client 12 and server 14 to server 14. However, for the purposes of illustrating the present invention, the communication paths of interest are a single server 14 beinig updated by multiple servers 14 and the single server 14 broadcasting to multiple clients. The communication channel 10 could be any medium capable of conveying digital data, such as a satellite channel, a cellular channel, a fiberoptic network, coaxial cable, or twisted pair copper wiring, etc. In any case, the communication channel 10 has a limited amount of information carrying capacity (bandwidth) and is shared by many clients 12 and many servers 14. In actual practice there could be millions of clients 12, each with its own list of required files, and millions of servers 14 ready to provide the information.

Figure 2:
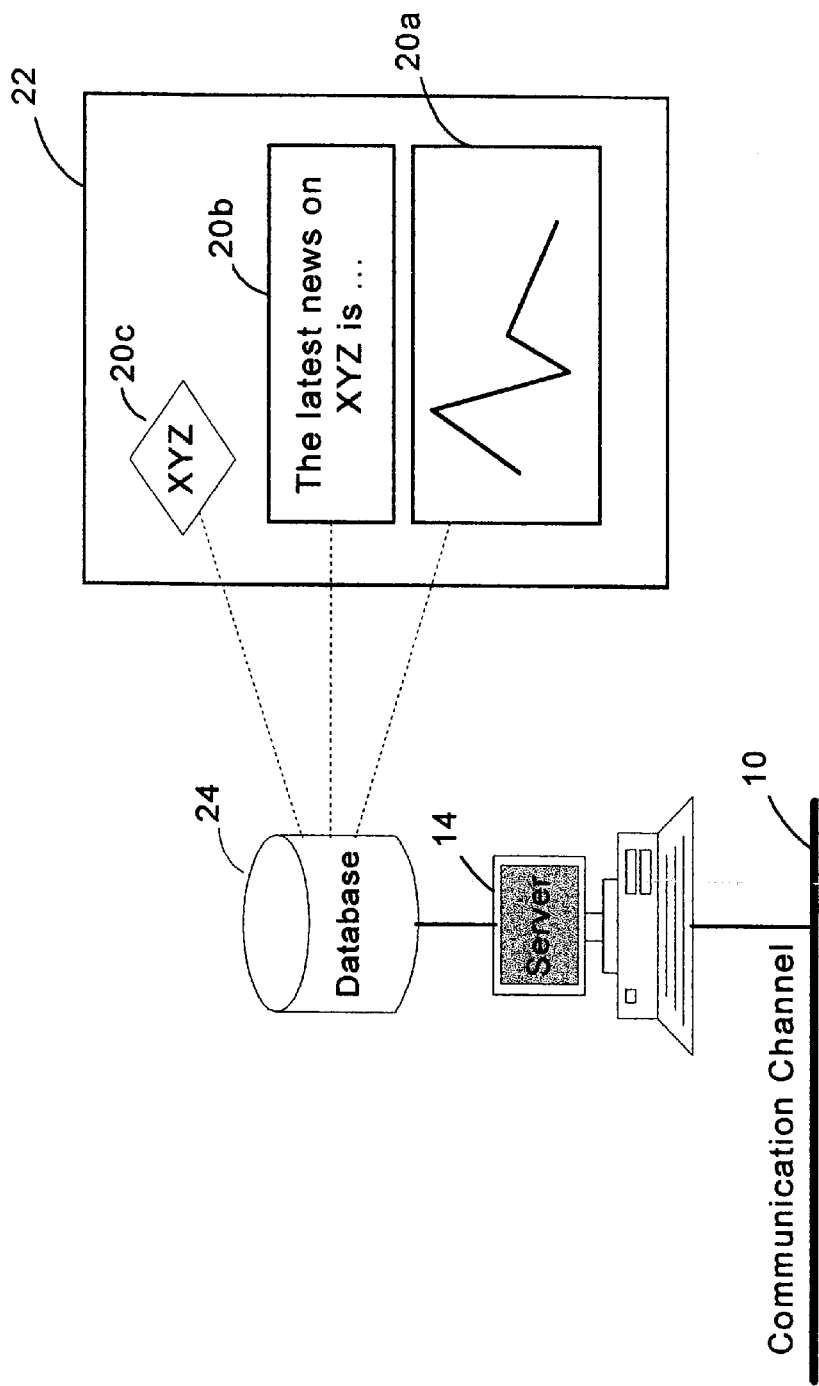
FIG. 2 is a more detailed diagram of the server shown in FIG. 1, along with the data files it serves.

Illustrated in FIG. 2 is a block diagram of the server 14 and the data files 20 it transmits, according to the present invention. A web page 22 is constructed from one or more component files 20. These files 20 are stored in a database 24 coupled to the server 14 and are occasionally updated from other servers 14 with more recent information. For example, a page 22 could be a stock market page dedicated to a particular company with a graph of the stock price 20a, the latest news story about that company 20b, and the company logo 20c. The graph 20a could be updated frequently (e.g., every 15 minutes), the news story 20b would be updated when appropriate (e.g., every few days) and the logo 20c may never change. This updating could be initiated by the other servers 14 (potentially employing the method of the present invention) or the present server 14 could anticipate a need for the updated data using the method of the present invention and acquire it. Accordingly, any client 12 (or a server acting like a client when acquiring data) requiring this page 22 would need to receive the logo 20c only once, the news story 20b occasionally, and the chart 20c frequently. However, not all clients 12 are listening to the communication channel 10 when one or more of the files 20 changes. Further, many clients 12 will develop a need for a page 22 after the most recent change to the files 20 that make up that page 22. Because the database 24 could contain a very large number of files 20, and given the limited bandwidth of the communication channel 10, the server 14 must prioritize the files 20 for transmission.

Figure 3:
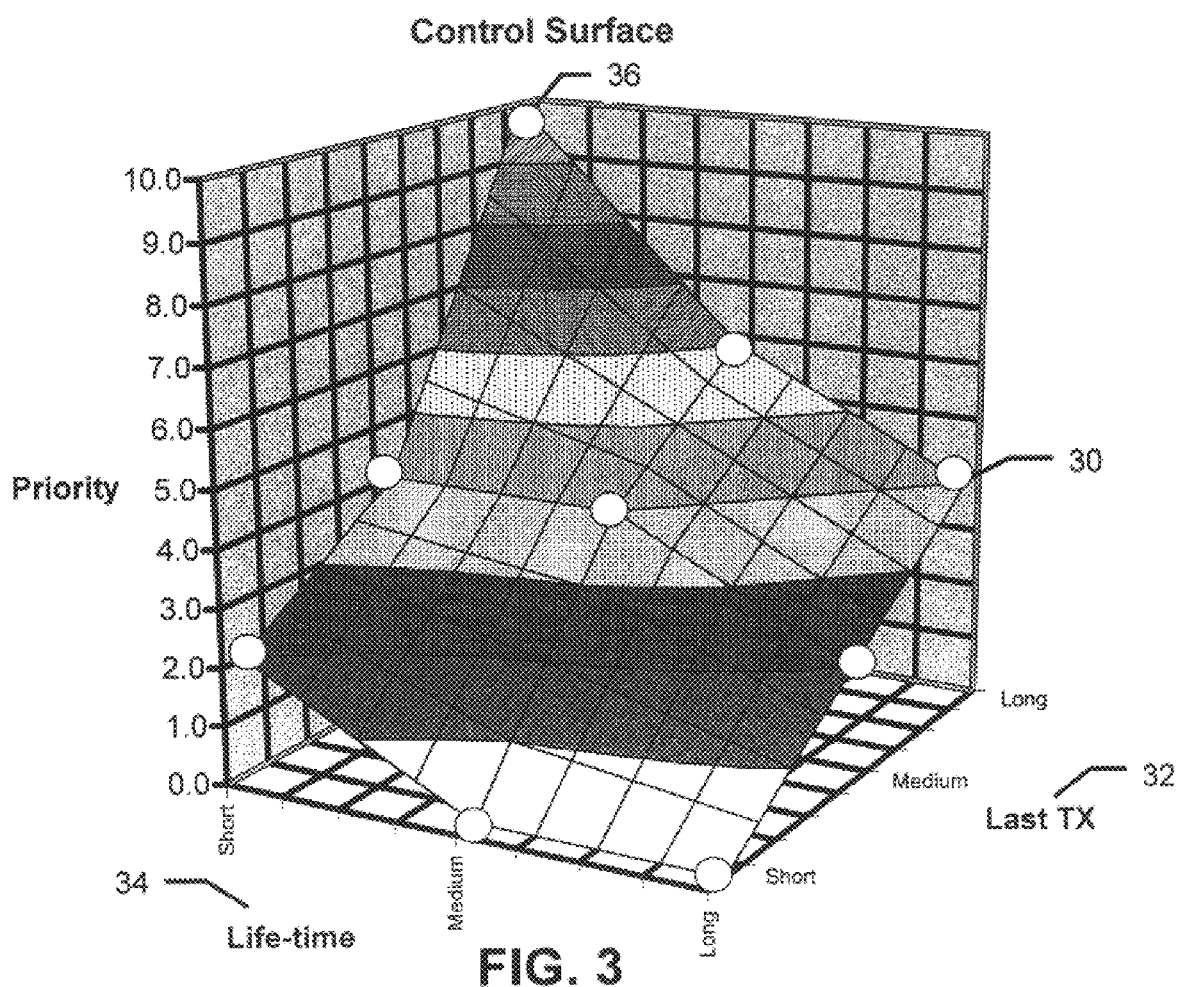
FIG. 3 is a three dimensional graph of a control surface, with two input variables and nine design coordinates, used to determine a transmission or acquisition priority for the files of FIG. 2.

Illustrated in FIG. 3 is one potential three dimensional control surface 30 used to determine file prioritization. Files 20 are prioritized for transmission or acquisition by determining their degree of membership in each fuzzy input variable and mapping them on to the multi-dimensional control surface 30. The final dimension of the control surface (the height in this case) is the priority assigned to the file 20.

In this example there are two input variables, namely, 'time since last transmission' 32 and 'expected lifetime' 34 of the file. However, it should be understood that any number of different input variables could be used. For example, the elapsed time from initial requirement to transmit a file 20 could be used to transmit newer files 20 more often than older ones. Similarly, the elapsed time from initial reception of a file could be used to acquire newer files 20 more often than older ones. An expiration time of a file 20 could be used to qualify what old means for a particular file 20.

Further, feedback from the clients 12 could be used to improve bandwidth utilization. For example, the number of clients 12 requiring a particular page 22, and therefore the files 20 that compose that page 22, could be used to prioritize files 20 required by more clients 12 over files 20 required by fewer clients 12. Similarly, the frequency of clients 12 actually viewing a particular page 22 of files 20 (as opposed to merely requiring it) could be used to prioritize files 20 viewed more often over files 20 viewed less often. Of course the actual priority could only be determined when taken in combination with the other variables. For example, it may be intended to prioritize files 20 viewed more often higher than files 20 viewed less often, however, if a file 20 that is viewed less often has a very short expected life-time 34, then the control surface 30 may dictate that it be sent first.

In practice only a few points on the control surface 30 are designed coordinates 36 that are stored in the system, with the remainder being determined via interpolation. In this example nine design coordinates 36 are used to define the three dimensional control surface 30, one for each combination of short, medium, and long of the two input variables. However, it should be understood that any number of design coordinates 36 could be used to define the control surface 30 and that the control surface 30 could have any number of dimensions.

In another embodiment, a server employs the method of the present invention to efficiently schedule and control the broadcast of Electronic Program Guide (EPG) information for Direct to Home (DTH) satellite or other local or wide area wired or wireless distribution system. The adaptive fuzzy system is employed to prioritize and order program guide data, such as (but not limited to) channel lineups, programming schedules, and program content descriptions for delivery to client (subscriber) systems.

Figure 4:
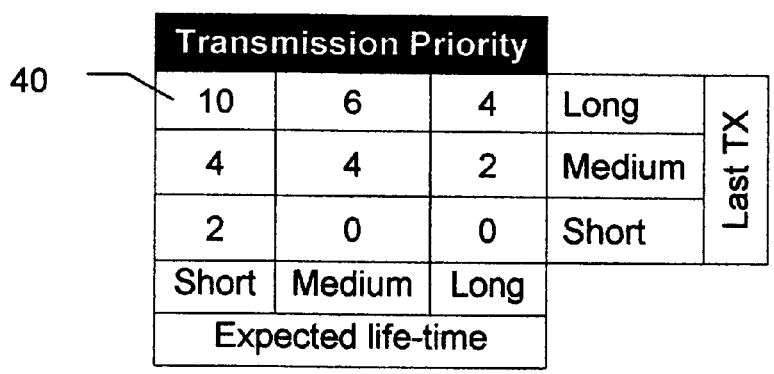
FIG. 4 is a matrix of rules used to frame the control surface of FIG. 3.

Illustrated in FIG. 4 are rules, depicted in matrix form, associated with the design coordinates 36 used to construct the control surface 30 of FIG. 3. For example, rule one 40 states that if the expected life-time is short and the time since the last transmission is long, then set the priority to very high, where very high is represented by the value ten. The rules used to construct the matrix are as follows:

1) if the expected life-time is short and the time since the last transmission is long, then set the priority to very high;

2) if the expected life-time is medium and the time since the last transmission is long, then set the priority to medium high;

3) if the expected life-time is long and the time since the last transmission is long, then set the priority to medium low;

4) if the expected life-time is short and the time since the last transmission is medium, then set the priority to medium low;

5) if the expected life-time is medium and the time since the last transmission is medium, then set the priority to medium low;

6) if the expected life-time is long and the time since the last transmission is medium, then set the priority to low;

7) if the expected life-time is short and the time since the last transmission is short, then set the priority to low;

8) if the expected life-time is medium and the time since the last transmission is short, then set the priority to very low;

9) if the expected life-time is long and the time since the last transmission is short, then set the priority to very low.

Consider the matrix a very coarse view of the control surface 30 looking straight down from above. The values of the design coordinates 36 (the priority in this example) are the outputs of the rules. The weight each of these rules carries can be adjusted by modifying the value of its output, thereby altering the shape of the control surface.

Figure 5:
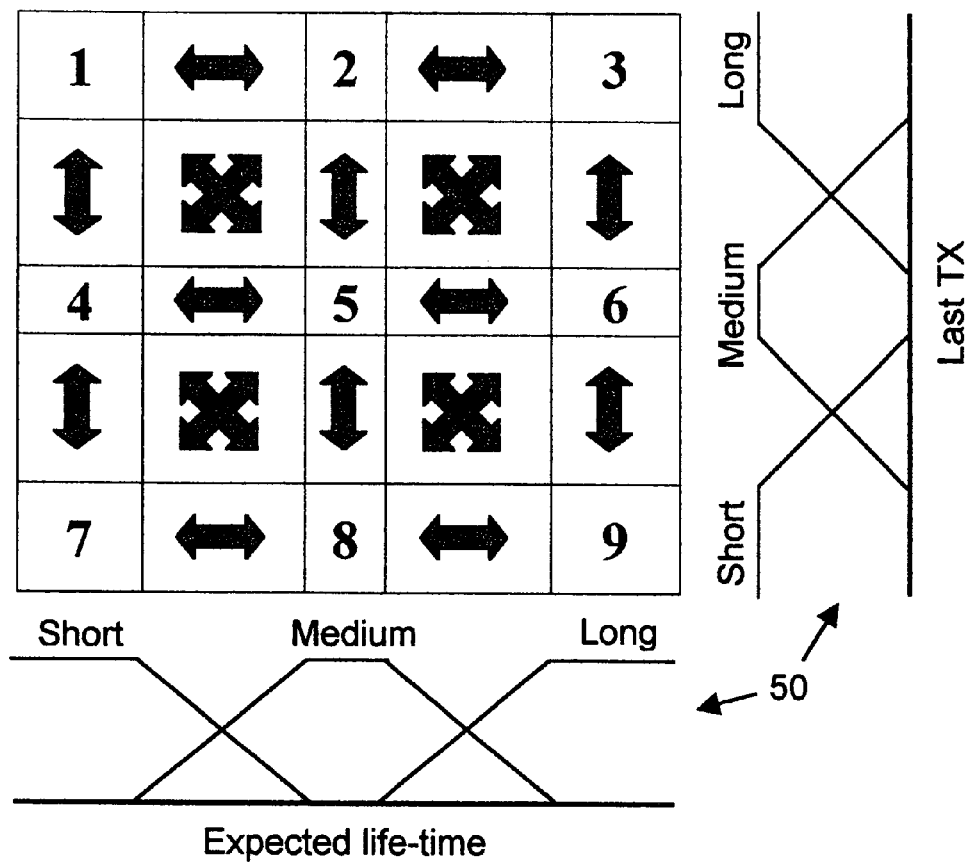
FIG. 5 is the matrix of rules of FIG. 4 with interpolated areas between the rules and trapezoidal membership functions on the axes to shape the control surface of FIG. 3.

Illustrated in FIG. 5 is another downward view of the control surface 30. The rule numbers associated with the design coordinates 36 are indicated in nine of the locations. A single rule governs the priority in these areas. The arrows indicate regions of the control surface 30 where more than one rule applies and interpolation is used. Trapezoidal membership functions 50 along the axes allegorize overlapping areas where more than one label of an input is partially true at the same time. The centroids of these trapezoids can be adjusted to alter the shape of the control surface. Of course, shapes other than trapezoids could be used.

Given the dynamic environment in which such a system is deployed, determining the best shape for the control surface is a moving target. Therefore, in the method of the present invention the control surface can be continually adjusted during operation to home in on the optimal shape and optimize the efficiency of the system.

In a first embodiment, each input axis is scaled to distribute the range of values associated with the current and/or some previous collection of files. For example, an adaptive rule for the 'expected lifetime' 34 variable might be that if 90% of the files seen in the last 10 days have an expected expiration time less than 12 hours, then anything greater than 11 hours is considered long and the rest of the values are scaled appropriately. Of course, any number of moving average and scaling functions could be used to adapt the control surface according to this method.

In a second embodiment, the weights of the rules and/or the centroids of the trapezoidal membership functions are adjusted (in affect the shape of the control surface is adjusted) in response to one or more performance metrics. Performance metrics are any type of feedback the system receives. For example, the number of files that are expiring before broadcast and the latency of new file transmission could be used. The system adjusts one or more of the weights and/or centroids in a random direction. If the performance metric improves, the adjustment continues in the same direction. If the performance metric degrades, another random direction is chosen. Eventually, in a stable environment, the system will converge on a small set of near optimal control surfaces; a circle of convergence. In a dynamic environment it will continue to chase the optimal control surface. Large adjustments will converge faster, but will also create a large circle of convergence. Of course, the size of the adjustment need not be constant. The system could use large adjustments when necessary to converge and then small adjustments to linger in a tight circle of convergence.

In another embodiment, a server or client acquiring files from a plurality of sources such as other servers employs the techniques of the present invention to efficiently schedule and control the retrieval of the files. Periodically, each of the files is assigned a degree of membership in two or more fuzzy variables (e.g., file age, urgency). The files are then mapped onto a multi-dimensional control surface to determine which files should be acquired first. As before, the relative importance of the fuzzy variables is characterized by the interpolated control surface constructed from weights and centroids of trapezoids or other functions. The centroids and weights are continually adjusted during operation to optimize the efficiency of the system in a dynamic environment.

In yet another embodiment, a server employs the method of the present invention to schedule and control both the acquisition and broadcast of a plurality of dynamic files. The server preferably maintains two control surfaces (although there could be just one), one for acquisition and one for broadcast. Each file is assigned a degree of membership in at least two fuzzy variables and mapped to each multi-dimensional control surface to determine when the files should be acquired and when they should be broadcast. Although the list of files could be different between the two, one list is preferred. For example, an uplink station of a Direct-To-Home (DTH) satellite communication system could efficiently acquire a plurality of files from servers over the Internet using the present invention. Those files could then be prioritized for broadcast, according to the method of the present invention, to a plurality of client stations coupled to satellite receiving dishes.

Figure 6:
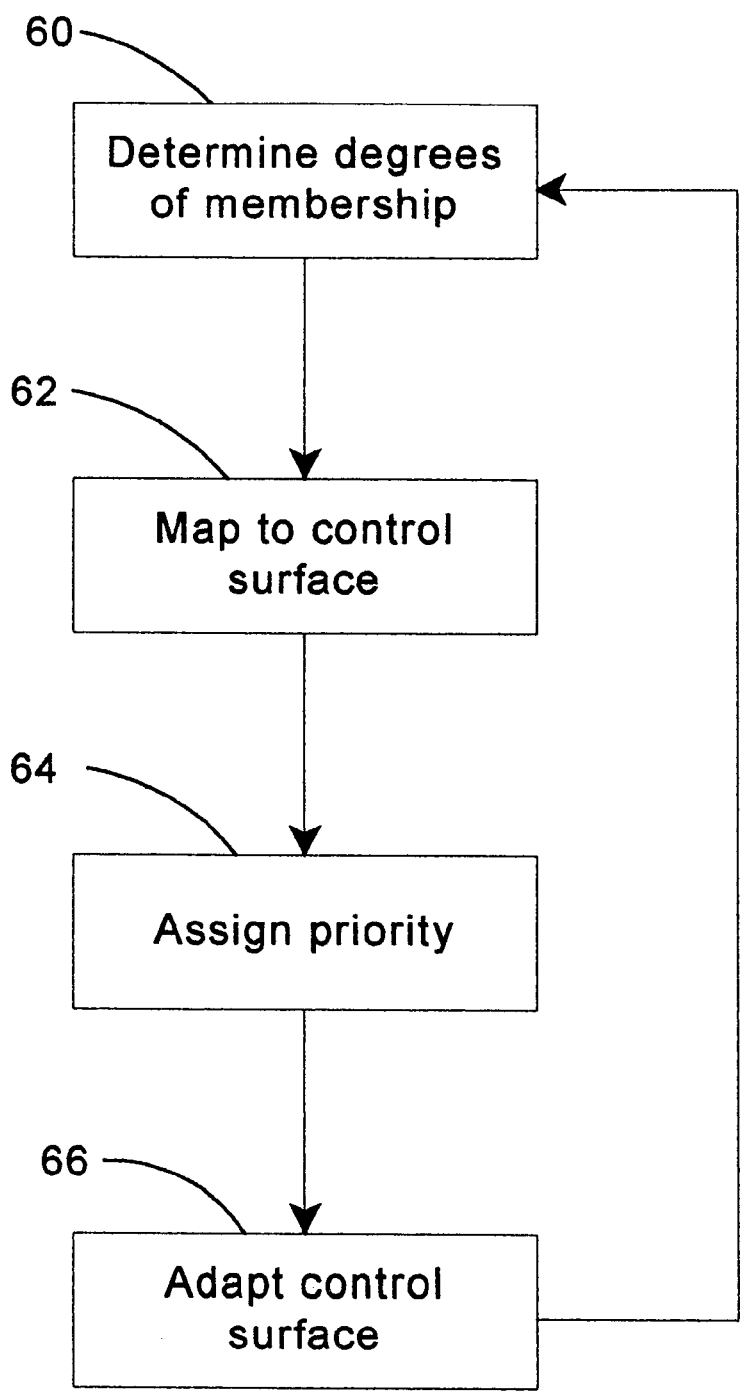
FIG. 6 is a flowchart which represents a program that may be used to perform a method of prioritizing a plurality of data files for broadcast transmission.

Illustrated in FIG. 6 is a flow chart which represents a program that could be used to perform the method of the present invention. At a block 60, a degree of membership is determined for each fuzzy variable of each file to be prioritized for transmission and/or retrieval. Each file's particular combination of membership is then mapped onto a multi-dimensional control surface, such as the one in FIG. 3, at a block 62. From the mapping, a priority for transmission and/or retrieval is assigned to each file at a block 64. The final dimension of the control surface at the coordinates dictated by the degrees of membership for the files is the assigned priority. Finally, at a block 66 the control surface is adapted for efficiency by adjusting its shape and scaling its axes. The shape of the control surface is adjusted by modifying the weights of the rules used to assign membership and/or moving the centroids of the membership functions in response to performance metrics. The axes are scaled by distributing a range of values from collections of files over the axes. The process of FIG. 6 is iterated periodically as needed.

The foregoing description of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for prioritizing a plurality of data files for broadcast transmission via a direct to home satellite communication system, comprising the steps of:

determining a degree of membership in each of at least two fuzzy variables associated with the files, one of the at least two fuzzy variables being an expiration time associated with at least one of the files;

mapping the at least two degrees of membership onto a control surface adapted for efficient broadcast of data files via a direct to home satellite communication system; and, assigning a transmission priority to the at least one of the files in response to the control surface mapping.

2. A method as defined in claim 1, wherein the data files are components of a web page.

3. A method as defined in claim 2, wherein the data files are acquired from the Internet.

4. A method as defined in claim 1, wherein the data files are components of an Electronic Program Guide (EPG).

5. A method as defined in claim 1, wherein the fuzzy variables include at least one of (a) elapsed time from initial requirement to transmit a file, (b) elapsed time from most recent transmission of file, (c) expected life-span of file, (d) number of clients requiring a file, and (e) frequency of clients viewing file.

6. A method for prioritizing a plurality of data files for acquisition via a network for subsequent broadcast transmission via a direct to home satellite communication system, comprising the steps of:

determining a degree of membership in each of at least two fuzzy variables associated with the files, one of the at least two fuzzy variables being an expiration time associated with at least one of the files;

mapping the at least two degrees of membership onto a control surface adapted for efficient acquisition of data files for subsequent broadcast satellite transmission; and, assigning an acquisition priority to the at least one of the files in response to the control surface mapping.

7. A method as defined in claim 6, wherein the data files are components of a web page.

8. A method as defined in claim 6, wherein the network is the Internet.

9. A method as defined in claim 6, wherein the fuzzy variables include at least one of (a) elapsed time from initial reception of a file, (b) elapsed time from most recent acquisition of file, (c) expected life-span of file, (d) number of clients requiring a file, and (e) frequency of clients viewing file.

* * * * *